United States Patent
Kasaba et al.

(10) Patent No.: US 9,238,431 B2
(45) Date of Patent: Jan. 19, 2016

(54) CONTROL APPARATUS FOR VEHICLE LAMP AND VEHICLE LAMP SYSTEM

(75) Inventors: Yusuke Kasaba, Shizuoka (JP); Masashi Yamazaki, Shizuoka (JP); Atsushi Toda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 210 days.

(21) Appl. No.: 13/473,858

(22) Filed: May 17, 2012

(65) Prior Publication Data
US 2012/0294020 A1 Nov. 22, 2012

(30) Foreign Application Priority Data
May 18, 2011 (JP) ................. 2011-111239

(51) Int. Cl.
*B60Q 1/00* (2006.01)
*F21V 1/00* (2006.01)
*B60Q 1/10* (2006.01)
*G01C 9/00* (2006.01)

(52) U.S. Cl.
CPC .. *B60Q 1/10* (2013.01); *G01C 9/00* (2013.01); *B60Q 2300/114* (2013.01); *B60Q 2300/116* (2013.01); *B60Q 2300/324* (2013.01)

(58) Field of Classification Search
CPC .................................. B01Q 1/10; G01C 9/00
USPC ......... 362/466, 473, 462; 701/1, 36; 702/141, 702/150, 154
See application file for complete search history.

(56) References Cited

U.S. PATENT DOCUMENTS

| | | | |
|---|---|---|---|
| 6,430,521 B1* | 8/2002 | Toda | 702/150 |
| 2003/0076045 A1 | 4/2003 | Toda et al. | |
| 2004/0240218 A1 | 12/2004 | Hayashi et al. | |
| 2005/0068780 A1* | 3/2005 | Hayashi | 362/460 |

FOREIGN PATENT DOCUMENTS

| | | | |
|---|---|---|---|
| JP | 2000-085459 | | 3/2000 |
| JP | 2001-341578 | | 12/2001 |
| JP | 2001341578 A | * | 12/2001 |
| JP | 2004-314856 | | 11/2004 |
| JP | 2005-81867 | | 3/2005 |
| JP | 2009-126268 | | 6/2009 |

OTHER PUBLICATIONS

European Patent Office, Search Report in Appln. No. 12168183.7 (dated Jan. 25, 2013).
Japanese Patent Office, Office Action in Japanese Application No. 2011-111239 (dated Dec. 24, 2014).

* cited by examiner

*Primary Examiner* — Tuan C. To
*Assistant Examiner* — Isaac Smith
(74) *Attorney, Agent, or Firm* — Fish & Richardson P.C.

(57) ABSTRACT

A control apparatus for a vehicle lamp includes a receiver to receive an acceleration signal indicative of an acceleration detected by an acceleration sensor, and a controller to derive an inclination angle of a vehicle relative to a horizontal plane from the acceleration signal. While the vehicle is stopped and if a change in the acceleration exceeds a threshold, the controller outputs an adjustment signal indicative of an instruction to adjust an optical axis of the vehicle lamp in accordance with a difference in the inclination angle before and after the change in the acceleration.

4 Claims, 5 Drawing Sheets

CONTROL APPARATUS FOR VEHICLE LAMP AND VEHICLE LAMP SYSTEM

CROSS-REFERENCE TO RELATED APPLICATION(S)

The present application claims the benefit of priority of Japanese Patent Application No. 2011-111239, filed on May 18, 2011, the contents of which are incorporated herein by reference.

TECHNICAL FIELD

The present disclosure relates to a control apparatus for a vehicle lamp and a vehicle lamp system, and more particularly, to a control apparatus for a vehicle lamp and a vehicle lamp system that are used in an automobile and the like.

BACKGROUND

In an automatic leveling control, an irradiation direction can be changed by automatically adjusting the position of an optical axis of a vehicle headlamp according to an inclination angle of the vehicle. Generally, in automatic leveling control, vehicle height sensors are used as an inclination detection unit of a vehicle, and the position of the optical axis of a headlamp is adjusted on the basis of a pitch angle of the vehicle that is detected by the vehicle height sensors. Alternatively, an automatic leveling control may be implemented by using an acceleration sensor for detecting a pitch angle of the vehicle (see, e.g., JP2000-085459A, JP2004-314856A, JP2001-341578A and JP2009-126268A).

By using an acceleration sensor to detect a pitch angle of a vehicle, it is possible to reduce the manufacturing cost as well as the weight of an automatic leveling system as compared with a situation in which vehicle height sensors are used. Nevertheless, there is a demand for improved accuracy of an automatic leveling control using an acceleration sensor.

SUMMARY

The present disclosure provides a technique that, in some implementations, improves the accuracy of automatic leveling control for adjusting the optical axis of a vehicle lamp using an acceleration sensor.

According to an aspect of the present disclosure, a control apparatus for a vehicle lamp is provided. The control apparatus includes a receiver and a controller. The receiver is configured to receive an acceleration signal indicative of an acceleration detected by an acceleration sensor. The controller is configured to derive an inclination angle of a vehicle relative to a horizontal plane from the acceleration signal. While the vehicle is stopped, and if a change in the acceleration exceeds a threshold, the controller outputs an adjustment signal indicative of an instruction to adjust an optical axis of the vehicle lamp in accordance with a difference in the inclination angle before and after the change in the acceleration.

According to an aspect of the present disclosure, a vehicle lamp system is provided. The vehicle lamp system includes a vehicle lamp having an adjustable optical axis, an acceleration sensor that detects the acceleration, and the control apparatus described above.

Other aspects, features and advantages will be apparent from the following description, the drawings and the claims.

DETAILED DESCRIPTION

A preferred implementation of the invention is described below with reference to the drawings. The same or equivalent elements, members, and processes, which are shown in the respective drawings, are denoted by the same reference numerals and, in general, the repeated description thereof will be not be repeated. Further, the particular illustrated implementation does not limit the invention, and is illustrative. The characteristics described with respect to this implementation or the combinations thereof are not necessarily essential.

Figure 1:
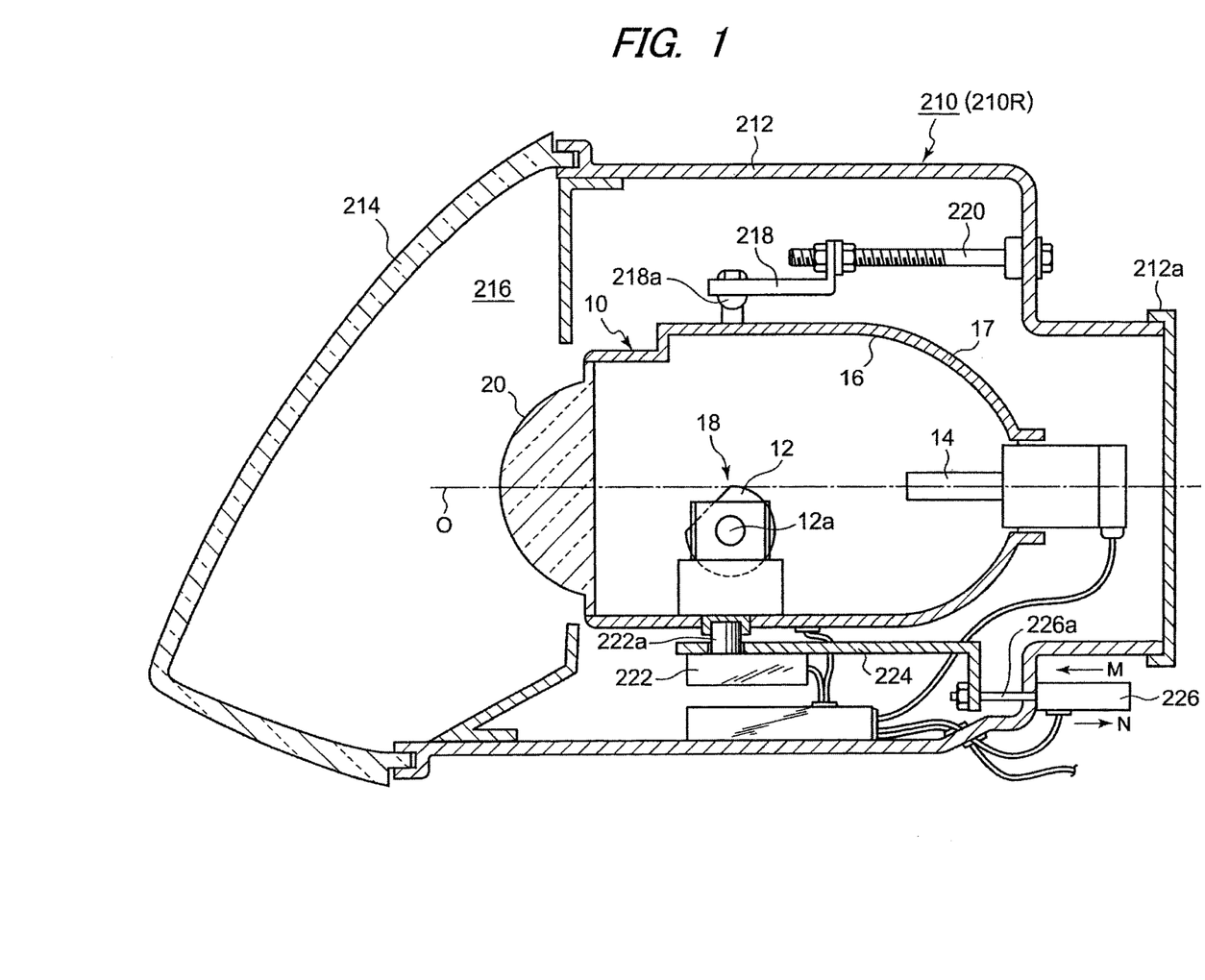
FIG. 1 is a schematic vertical cross-sectional view of a headlamp including a lamp unit that is an object to be controlled by a leveling electronic control unit (hereinafter, "leveling ECU")

FIG. 1 is a schematic vertical cross-sectional view of a headlamp including a lamp unit that is an object to be controlled by a leveling ECU according to a first implementation. Two headlamps 210, which are symmetrical to each other, are disposed, respectively, at the left and right portions of a vehicle in a vehicle width direction. The headlamps, which are disposed at the right and left portions of the vehicle, have substantially the same structure except for the symmetrical structure. Accordingly, the structure of the right headlamp 210R will be described below, and detailed description of the left headlamp will be appropriately omitted.

The headlamp 210R includes a lamp body 212 and a translucent cover 214. The lamp body 212 includes an opening that is formed at its front portion in the longitudinal direction of the vehicle. The translucent cover 214 covers the opening. The lamp body 212 includes a detachable cover 212a that is provided at its rear portion in the longitudinal direction of the vehicle and that can be detached. A lamp chamber 216 is formed by the lamp body 212 and the translucent cover 214. A lamp unit 10 (vehicle lamp), which emits light to the front side of the vehicle, is received in the lamp chamber 216.

A lamp bracket 218, which includes a pivot mechanism 218a serving as a swiveling center of the lamp unit 10 in vertical and horizontal directions, is formed at a part of the lamp unit 10. The lamp bracket 218 is threadably engaged with aiming adjustment screws 220 that are rotatably supported by the wall surface of the lamp body 212. Accordingly, the lamp unit 10 is fixed at a predetermined position in the lamp chamber 216 that is set according to the adjustment states of the aiming adjustment screws 220, and can swivel about the pivot mechanism 218a at that position so that the posture of the lamp unit is changed to a forward inclined posture or a backward inclined posture. Further, a rotating shaft 222a of a swivel actuator 222 is fixed to the lower surface of the lamp unit 10. The swivel actuator 222 is fixed to a unit bracket 224.

A leveling actuator 226, which is disposed outside the lamp body 212, is connected to the unit bracket 224. The leveling actuator 226 is formed, for example, of a motor or the like that pushes and pulls a rod 226a in directions of arrows M and N. When the rod 226a is pushed in the direction of the arrow M, the lamp unit 10 swivels about the pivot mechanism 218a so as to be in the backward inclined posture. In contrast, when the rod 226a is pulled in the direction of the arrow N, the lamp unit 10 swivels about the pivot mechanism 218a so as to be in the forward inclined posture. When the lamp unit 10 is in the backward inclined posture, it is possible to perform leveling adjustment that makes a pitch angle of an optical axis O (that is, an angle of the optical axis O in a vertical direction) be directed to the upper side. Further, when the lamp unit 10 is in the forward inclined posture, it is possible to perform leveling adjustment that makes the pitch angle of the optical axis O be directed to the lower side.

The lamp unit 10 may include an aiming adjustment mechanism. For example, an aiming pivot mechanism, which functions as a swiveling center at the time of aiming adjustment, is disposed at a connection portion between the unit bracket 224 and the rod 226a of the leveling actuator 226. Further, the above-mentioned aiming adjustment screws 220 are disposed at the lamp bracket 218 with a gap between them in the vehicle width direction. Furthermore, when the two aiming adjustment screws 220 are rotated, the lamp unit 10 swivels about the aiming pivot mechanism in the vertical and horizontal directions. Accordingly, it is possible to adjust the optical axis O in the vertical and horizontal directions.

The lamp unit 10 includes a shade mechanism 18 including a rotary shade 12, a light source 14, a lamp housing 17 that supports a reflector 16 on its inner wall, and a projection lens 20. For example, an incandescent bulb, a halogen lamp, a discharge bulb, an LED, or the like may be used as the light source 14. An example where the light source 14 is formed of a halogen lamp is described in this implementation. The reflector 16 reflects light that is emitted from the light source 14. A portion of the light emitted from the light source 14 and the light reflected by the reflector 16 are guided to the projection lens 20 through the rotary shade 12.

The rotary shade 12 is a cylindrical member that is rotatable about a rotating shaft 12a. Moreover, the rotary shade 12 includes a cutout portion that is formed by cutting out a part of the rotary shade in an axial direction, and shade plates. Any one of the cutout portion and the shade plates is moved onto the optical axis O, so that a predetermined light distribution pattern is formed. At least a part of the reflector 16 is formed in an ellipsoidal shape, and the ellipsoidal surface of the reflector is set so that the shape of the cross-section of the ellipsoidal surface, which includes the optical axis O of the lamp unit 10, becomes at least a part of an elliptical shape. The ellipsoidal portion of the reflector 16 has a first focus substantially at the center of the light source 14, and has a second focus on the rear focal plane of the projection lens 20.

The projection lens 20 is disposed on the optical axis O extending in the longitudinal direction of the vehicle. The light source 14 is disposed on the rear side of a rear focal plane that is a focal plane including the rear focus of the projection lens 20. The projection lens 20 is a plano-convex aspheric lens having a convex front surface and a flat rear surface. The projection lens projects a light source image, which is formed on the rear focal plane, onto a virtual vertical screen, which is formed in front of the lamp, as an inverted image. In some implementations (e.g., a reflector-type lamp unit), the lamp unit may not include the projection 20.

Figure 2:
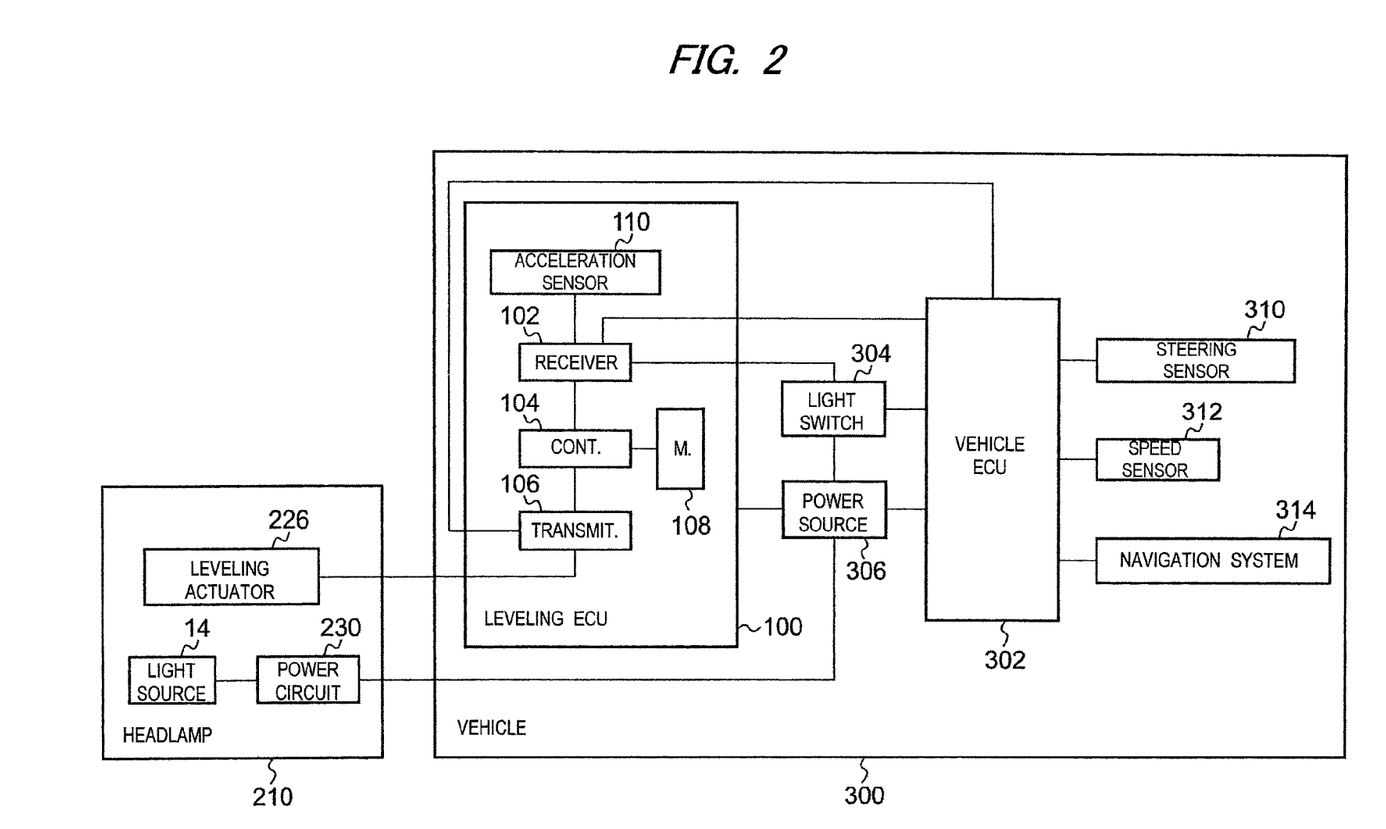
FIG. 2 is a functional block diagram illustrating the operational interaction of the headlamp, a vehicle electronic control unit (hereinafter, "vehicle ECU"), and the leveling ECU.

FIG. 2 is a functional block diagram illustrating the operational interaction of the headlamp, a vehicle ECU, and the leveling ECU. As described above, the structure of the right headlamp 210R is basically the same as that of the left headlamp. Therefore, in FIG. 2, the headlamp 210R and the headlamp are collectively represented as the headlamp 210. The leveling ECU 100 is implemented by using devices and circuits including a CPU and a memory in terms of hardware, and is implemented by a computer program or the like in terms of software. In FIG. 2, the leveling ECU is illustrated as functional blocks that are realized by the interaction of the foregoing components. These functional blocks may be realized in various ways by the combination of hardware and software.

The leveling ECU 100 (a control apparatus for a vehicle lamp) includes a receiver 102, a controller 104, a transmitter 106, a memory 108, and an acceleration sensor 110. The leveling ECU 100 is installed, for example, near a dashboard of the vehicle 300. In some implementations, the installation position of the leveling ECU 100 may be provided, for example, in the headlamp 210. Further, the acceleration sensor 110 may be provided outside the leveling ECU 100. A light switch 304 and a vehicle ECU 302 mounted on the vehicle 300 are connected to the leveling ECU 100. Signals, which are output from the vehicle ECU 302 and the light switch 304, are received by the receiver 102. Further, the receiver 102 receives a value output from the acceleration sensor 110.

Since a steering sensor 310, a vehicle speed sensor 312, a navigation system 314, and the like are connected to the vehicle ECU 302, the vehicle ECU 302 can acquire a variety of types of information from these sensors and can transmit the information, for example, to the leveling ECU 100. For example, the vehicle ECU 302 transmits an output value of the vehicle speed sensor 312 to the leveling ECU 100. Accordingly, the leveling ECU 100 can detect the traveling state of the vehicle 300.

The light switch 304 transmits a signal that instructs the headlamp 210 to be turned on/off, a signal that instructs the headlamp 210 to form a light distribution pattern, a signal that instructs the automatic leveling control to be performed, and the like to a power source 306, the vehicle ECU 302, the leveling ECU 100, and the like according to the operation of a driver. For example, the light switch 304 transmits a signal, which instructs the automatic leveling control to be performed, to the leveling ECU 100. Accordingly, the leveling ECU 100 starts performing automatic leveling control.

A signal, which is received by the receiver 102, is transmitted to the controller 104. The controller 104 derives the change of an inclination angle of the vehicle 300 on the basis of the information, which is kept in the memory 108, according to need and the value output from the acceleration sensor 110 transmitted from the receiver 102, and generates an adjustment signal that instructs the optical axis of the lamp unit 10 to be adjusted. The controller 104 outputs the generated adjustment signal to the leveling actuator 226 from the transmitter 106. The leveling actuator 226 is driven on the basis of the received adjustment signal so that the optical axis O of the lamp unit 10 is adjusted in the vertical direction of the vehicle (the direction of the pitch angle).

The leveling ECU 100, the vehicle ECU 302, and the power source 306, which supplies power to the headlamp 210, are mounted on the vehicle 300. When the turning-on operation of the headlamp 210 is instructed by operation of the light switch 304, power is supplied to the light source 14 from the power source 306 through a power circuit 230.

Figure 3:
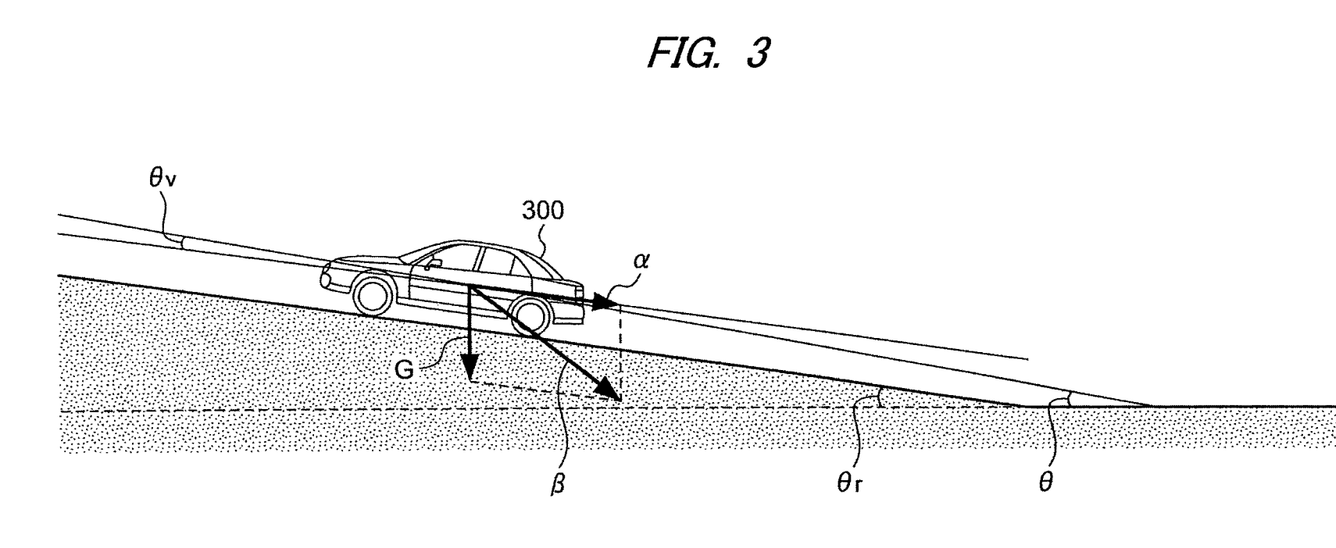
FIG. 3 is a schematic view illustrating an acceleration vector generated at a vehicle and an inclination angle of the vehicle that can be detected by an acceleration sensor.
Figure 4:
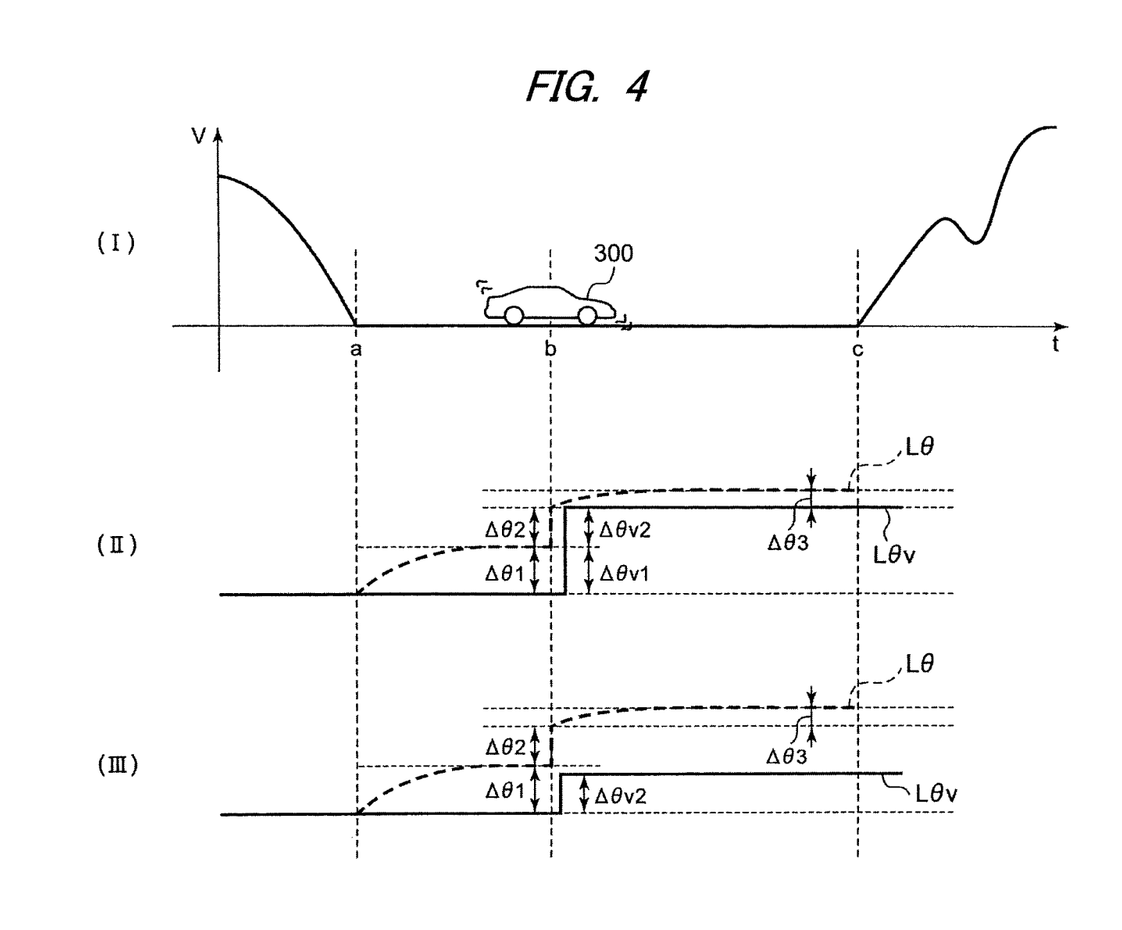
FIG. 4 is a schematic view illustrating automatic leveling control that is performed by the leveling ECU according to the first implementation.

Subsequently, the automatic leveling control, which is performed by the leveling ECU, is described in greater detail below. FIG. 3 is a schematic view illustrating an acceleration vector generated at a vehicle and an inclination angle of the vehicle that can be detected by the acceleration sensor. FIG. 4 is a schematic view illustrating the automatic leveling control that is performed by the leveling ECU according to the first implementation. In FIG. 4, (I) shows the change of the speed V of the vehicle 300 with the lapse of time t, (II) shows the change (solid line L$\theta$v) of a reference value of a vehicle attitude angle $\theta$v with respect to the change (broken line L$\theta$) of a total angle $\theta$ while the vehicle is stopped in the automatic leveling control according to a comparative example, and (III) shows the change (solid line L$\theta$v) of a reference value of a vehicle attitude angle $\theta$v with respect to the change (broken line L$\theta$) of a total angle $\theta$ while the vehicle is stopped in the automatic leveling control according to the first implementation.

For example, when luggage is loaded in a luggage compartment located at the rear portion of the vehicle, or when persons are seated in the rear seats of the vehicle, the posture of the vehicle inclines backward. When luggage is unloaded or occupants seated in the rear seats get out of the vehicle, the vehicle is inclined forward relative to the backward inclined posture. The irradiation direction of the lamp unit 10 also is changed in the vertical direction according to the posture of the vehicle 300, so that the range of light emitted forward increases or decreases. Further, the leveling ECU 100 derives the change of the inclination angle of the vehicle in a pitch direction from the value output from the acceleration sensor 110, and sets the pitch angle of the optical axis O to an angle, which corresponds to the posture of the vehicle, by controlling the leveling actuator 226. Since the automatic leveling control for performing the leveling adjustment of the lamp unit 10 in real time on the basis of the posture of the vehicle is performed as described above, it is possible to adjust the range of light, which is emitted forward, to an optimum distance even though the posture of the vehicle is changed.

Here, the acceleration sensor 110 is, for example, a three-axis acceleration sensor that has an X axis, a Y axis, and a Z axis perpendicular to one another. The acceleration sensor 110 is mounted on the vehicle 300 at an arbitrary posture, and detects an acceleration vector generated at the vehicle 300. Gravity acceleration and motion acceleration caused by the movement of the vehicle 300 are generated as the vehicle 300 is traveling. For this reason, as shown in FIG. 3, the acceleration sensor 110 can detect a resultant acceleration vector $\beta$ of a gravity acceleration vector G and a motion acceleration vector $\alpha$. Further, while the vehicle 300 is stopped, the acceleration sensor 110 can detect the gravity acceleration vector G. The acceleration sensor 110 outputs numerical values of the respective X, Y, and Z-axis components of the detected acceleration vector. The numerical values of the respective X, Y, and Z-axis components, which are output from the acceleration sensor 110, are converted into components of a longitudinal axis, a horizontal axis, and a vertical axis of the vehicle, by the controller 104.

While the vehicle is stopped, the inclination of the vehicle 300 relative to the gravity acceleration vector G can be derived from the value output from the acceleration sensor 110. That is, from the acceleration detected by the acceleration sensor 110, the total angle $\theta$ (i.e., the inclination angle of the vehicle relative to the horizontal plane) can be obtained. The total angle $\theta$ includes a road surface angle $\theta$r (a first angle), which is an inclination angle of a road surface relative to the horizontal plane, and a vehicle attitude angle $\theta$v (a second angle), which is an inclination angle of the vehicle relative to the road surface. Each of the road surface angle $\theta$r, the vehicle attitude angle $\theta$v and the total angle $\theta$ can be regarded as the angle of the longitudinal axis of the vehicle 300 in up-down directions, i.e., the pitch angle of the vehicle 300.

An object of the above-mentioned automatic leveling control is to keep the range of light, which is emitted forward, at an optimum distance by absorbing the change of the range of light, which is emitted forward from the vehicle lamp, caused by the change of the inclination angle of the vehicle. Accordingly, the inclination angle of the vehicle, which is required for the automatic leveling control, is the vehicle attitude angle $\theta$v. For this reason, in the automatic leveling control using the acceleration sensor 110, it is desirable to perform control so that the position of the optical axis of the lamp unit 10 is adjusted when the change of the total angle $\theta$ derived from the acceleration detected by the acceleration sensor 110 is caused by the change of the vehicle attitude angle $\theta$v and the position of the optical axis of the lamp unit 10 is maintained when the change of the total angle $\theta$ is caused by the change of the road surface angle $\theta$r.

Therefore, the controller 104 of the leveling ECU 100 derives the total angle $\theta$ from the acceleration signal received from the acceleration sensor 110, and while the vehicle is stopped, the controller 104 generates, when it is determined that there is a change in the acceleration caused by a change of a vehicle orientation that requires the optical axis O of the lamp unit 10 to be adjusted, an adjustment signal indicative of an instruction to adjust the optical axis O in accordance with a difference in the total angle $\theta$ before and after the change in the acceleration, and outputs the adjustment signal through the transmitter 106. While the vehicle is traveling, the vehicle attitude angle $\theta$v is rarely changed by a change in the amount of load or the number of people on the vehicle. Therefore, the change of the total angle $\theta$ while the vehicle is traveling can be regarded as the change of the road surface angle $\theta$r. Accordingly, the controller 104 adjusts the optical axis as described above with respect to the change of the total angle $\theta$ while the vehicle is stopped.

With respect to the change of the total angle $\theta$ while the vehicle is traveling, the controller 104 avoids outputting the adjustment signal. While the vehicle is stopped, the road surface angle $\theta$r is rarely changed by the movement of the vehicle 300. Therefore, while the vehicle is stopped, the change of the total angle $\theta$ can be regarded as the change of the vehicle attitude angle $\theta$v. Accordingly, the controller 104 avoids adjusting the optical axis with respect to the change of the total angle $\theta$ while the vehicle is traveling. The controller 104 may avoid outputting the adjustment signal by not generating the adjustment signal, or may avoid outputting the adjustment signal after generating the adjustment signal. Alternatively, with respect to the change of the total angle $\theta$ while the vehicle is traveling, the controller 104 may generate a maintaining signal indicative of an instruction to maintain the position of the optical axis, and may avoid adjusting the optical axis by outputting the maintaining signal.

Specifically, first, the vehicle 300 is placed on the horizontal plane, for example, at a vehicle maker's manufacturing plant, a dealer's maintenance shop, or the like, and this state is referred to as a reference state. The reference state is, for example, a state where one person gets in the driver's seat of the vehicle 300. Further, an initialization signal is transmitted to the leveling ECU 100 by operation of a switch of an initialization processor, or the like. When receiving the initialization signal through the receiver 102, the controller 104 starts initial aiming adjustment and adjusts the optical axis O of the lamp unit 10 to an initial set position. Moreover, the controller 104 records and keeps the value output from the acceleration sensor 110, when the vehicle 300 is in the reference state, in the memory 108 as the reference value) (θv=0°) of the vehicle attitude angle θv. The controller 104 may store the value output from the acceleration sensor 110, when the vehicle 300 is in the reference state, as the reference value) (θr=0°) of the road surface angle θr in addition to storing the reference value of the vehicle attitude angle θv.

When the vehicle 300 is actually used, the controller 104 avoids adjusting the optical axis with respect to the change of the total angle θ while the vehicle is traveling. Further, when there is a change (vibration) in the acceleration that is detected by the acceleration sensor 110 while the vehicle is stopped and the change exceeds a threshold, the controller 104 updates the reference value of the vehicle attitude angle θv while using a difference in the total angle θ before and after the change as a difference in the vehicle attitude angle θv, generates an adjustment signal by using the updated reference value of the vehicle attitude angle θv, and outputs the adjustment signal.

Whether the vehicle 300 is traveling or stopped may be determined by the vehicle speed obtained from the vehicle speed sensor 312. For example, it may be determined that the vehicle is traveling if the value detected by the vehicle speed sensor 312 exceeds 0, and that the vehicle is stopped if the value detected by the vehicle speed sensor 312 is 0. Criterion for determining whether "the vehicle is traveling" and whether "the vehicle is stopped" may optionally be set on the basis of experiments or simulations.

Examples of "a change of a vehicle orientation that requires the optical axis O of the lamp unit 10 to be adjusted" may include a change that is caused by the change of a load applied to the vehicle 300 such as passengers getting on and off, or the loading and unloading of luggage. On the other hand, examples of a change of a vehicle orientation that is excluded as a change that triggers the optical axis adjustment may include a change that is caused by an extension of a suspension that has been compressed while the vehicle is stopping or by a crawling movement of the vehicle stopping immediately after a crawling speed start.

The suspension that has been compressed due to the deceleration of the vehicle 300 while the vehicle is stopping gradually extends while the vehicle is stopped (hereinafter, the compression of the suspension while the vehicle is stopping, where the extension of the suspension after the compression may be referred to as the displacement of the suspension). Because the controller 104 deems the change of the total angle θ while the vehicle is stopped as the change of the vehicle attitude angle θv and adjusts the optical axis, the compression of the suspension occurring while the vehicle is stopping (i.e., while the vehicle is still traveling) is not treated as the change of the vehicle attitude angle θv. On the other hand, the extension of the suspension occurring while the vehicle is stopped is treated as the change of the vehicle attitude angle θv.

Accordingly, if the change of the total angle θ, which is caused by the displacement of the suspension, is used as a target for the adjustment of an optical axis, only the change of the total angle θ caused by the extension of the suspension becomes a target for the adjustment of an optical axis. For this reason, there is a possibility that the position of the optical axis may deviate from a position corresponding to an actual vehicle attitude angle θv. Accordingly, the change of a vehicle orientation, which is caused by the displacement of the suspension, is to be excluded from a target for the adjustment of an optical axis.

Further, the crawling speed movement of the vehicle accompanies the sinking of the suspension at the time of crawling speed start. The suspension, which sinks at the time of the crawling speed start, does not always return to an original position while the vehicle is stopped, and a part of a contracted portion of the suspension, which contracts due to the crawling speed movement of the vehicle, may extend during the normal traveling of the vehicle. The extension of the contracted portion of the suspension, which contracts due to the crawling speed movement of the vehicle, while the vehicle is traveling is not used as a target for the adjustment of an optical axis. For this reason, if the change of the total angle θ, which is caused by the crawling speed movement of the vehicle, is used as a target for the adjustment of an optical axis, there is a possibility that the position of an optical axis may deviate. Accordingly, the change of a vehicle orientation, which is caused by the crawling speed movement of the vehicle, is excluded from a target for the adjustment of an optical axis.

The change of the vehicle speed may not be detected by the vehicle speed sensor 312 in the crawling speed movement of the vehicle. In another instance, due to the time lag of communication, the controller 104 may not receive a vehicle speed signal from the vehicle speed sensor 312 when receiving acceleration, which is changed due to the crawling speed movement of the vehicle, from the acceleration sensor 110. In these instances, the controller 104 cannot detect that the vehicle 300 starts at a crawling speed and is in a traveling state. For this reason, the change of a vehicle orientation caused by the crawling speed movement of the vehicle may be included in the change of a vehicle orientation while the vehicle is stopped.

Accordingly, it is possible to reduce the deviation of the position of the optical axis, which may occur when the change of a vehicle orientation caused by the displacement of the suspension or the crawling speed movement of the vehicle is used as a target for the adjustment of an optical axis, by outputting an adjustment signal when there is the change of acceleration where the change of a vehicle orientation where the optical axis O is to be adjusted as described above is estimated. Further, there is a possibility that a detection error of the acceleration sensor 110, a calculation error of the controller 104, and the like may be included in the change of the total angle θ while the vehicle is stopped. For this reason, it is possible to avoid the increase of the deviation of the position of the optical axis, which may occur when the adjustment of the optical axis is repeated at a predetermined interval while the vehicle is stopped, by outputting an adjustment signal when there is the change of acceleration where the change of a vehicle orientation where the optical axis O is to be adjusted is estimated.

It is possible to estimate the change of a vehicle orientation, where the optical axis O of the lamp unit 10 is to be adjusted, from the variation of the acceleration detected by the acceleration sensor 110. That is, normally, when there is the change of a load, the vehicle 300 further vibrates as compared to a case where there is the displacement of the suspension or the crawling speed movement of the vehicle. For this reason, acceleration, which is detected by the acceleration sensor 110, is more significantly changed. Accordingly, it is possible to estimate the change of a vehicle orientation, where the optical axis O is to be adjusted, by setting a threshold to the change of acceleration and determining whether the change of acceleration exceeds the threshold. The "threshold" may optionally be set on the basis of experiments or simulations.

Further, the controller 104 adjusts the optical axis in accordance with a difference in the total angle θ between the beginning and end of vibration as described above. That is, the controller 104 updates a reference value and adjusts the optical axis while using a difference in the total angle θ between the beginning and end of vibration as a difference in the vehicle attitude angle θv. Accordingly, it is possible to reduce further the deviation of the position of the optical axis that is caused by the displacement of the suspension and the like.

That is, for example, as shown in (I) of FIG. 4, it is assumed that the vehicle 300 stops at the time a, vibration caused by the getting-on/off of persons or the like is generated in the vehicle 300 at the time b, and the vehicle 300 starts at the time c. In this case, as shown in (II) and (III) of FIG. 4, the total angle θ obtained by the acceleration sensor 110 is changed due to time vibration by a variation Δθ2 and is changed between the time b and the time c due to the displacement of the suspension by a variation Δθ3.

The reference value of the vehicle attitude angle θv is changed as described below with respect to the change of the total angle θ in the automatic leveling control of the comparative example. The automatic leveling control of the comparative example is a control that updates the reference value and adjusts the optical axis while a difference between the total angle θ after vibration and the reference value of the vehicle attitude angle θv kept in the memory 108 is used as a difference in the vehicle attitude angle θv. Accordingly, in the comparative example, as shown in (II) of FIG. 4, the reference value of the vehicle attitude angle θv is changed by a variation Δθv1 corresponding to a variation Δθ1 of the total angle θ that is caused by the displacement of the suspension between the time a and time b, and a variation Δθv2 corresponding to a variation Δθ2 of the total angle θ. Therefore, in the comparative example, a part of the change of a vehicle orientation caused by the displacement of the suspension is included in a target for the adjustment of an optical axis.

In contrast, according to the automatic leveling control of this embodiment, the reference value is updated and the optical axis is adjusted while a difference in the total angle θ between the beginning and end of the generation of vibration is used as a difference in the vehicle attitude angle θv. Accordingly, as shown in (III) of FIG. 4, the reference value of the vehicle attitude angle θv is changed by a variation Δθv2. Therefore, according to the automatic leveling control of the leveling ECU 100 according to this embodiment, it is possible to exclude the change of a vehicle orientation, which is caused by the displacement of the suspension before vibration, from a target for the adjustment of an optical axis. As a result, it is possible to further reduce the deviation of the position of the optical axis as compared to the comparative example.

When the reference value of the road surface angle θr is recorded in the memory 108, the controller 104 calculates the road surface angle θr by subtracting the reference value of the vehicle attitude angle θv from the current total angle θ at the time of the stop of the vehicle and may use the obtained road surface angle θr as a new reference value. The period of "while the vehicle is stopping" is, for example, until a value detected by the acceleration sensor 110 is stabilized in a state in which a value detected by the vehicle speed sensor 312 is 0. The criteria for determining whether "the vehicle is stopping" may optionally be set on the basis of experiments or simulations.

Figure 5:
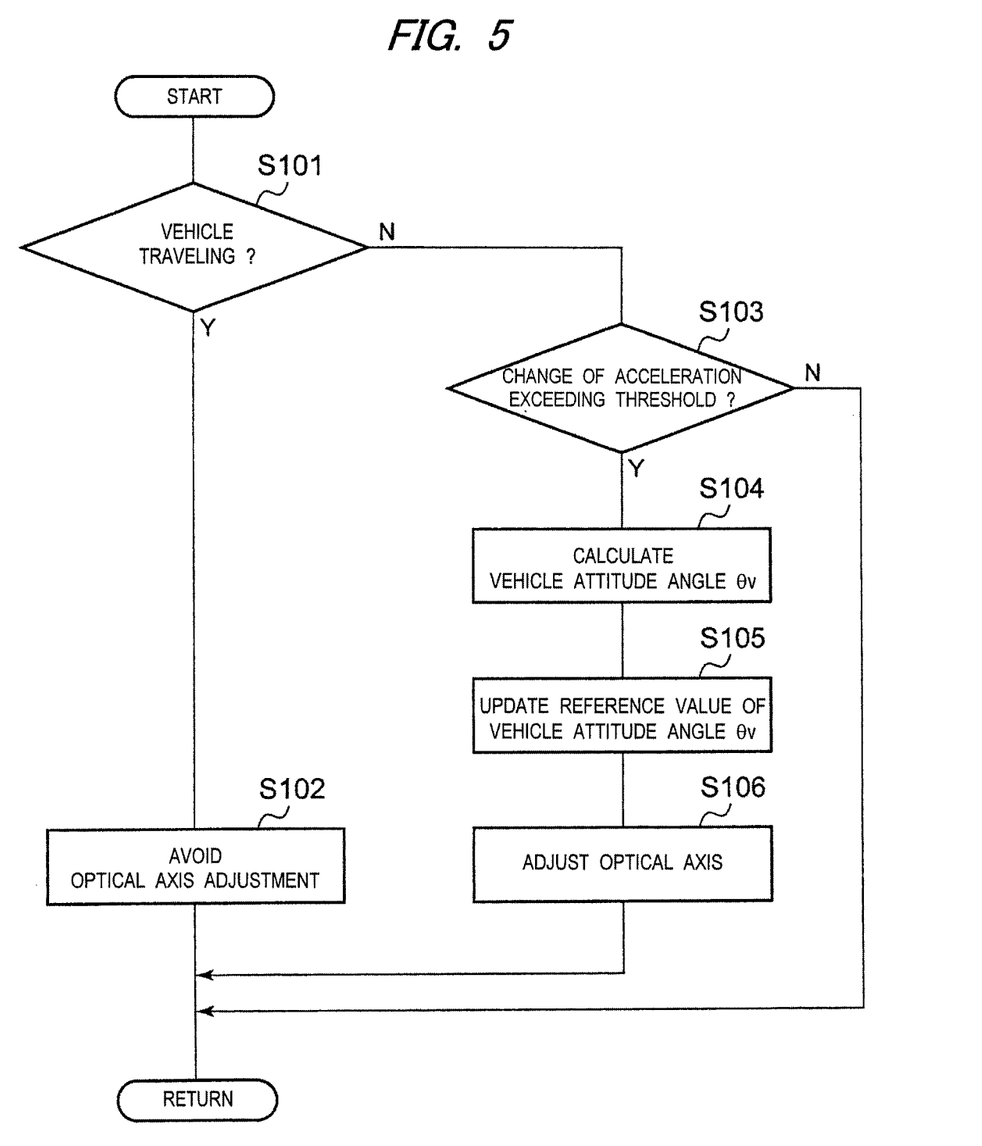
FIG. 5 is a flowchart of the automatic leveling control that is performed by the leveling ECU according to the first implementation.

FIG. 5 is a flowchart of the automatic leveling control that is performed by the leveling ECU according to the first implementation. In the flowchart of FIG. 5, a procedure of each part is shown by the combination of S (i.e., a Step) and numerals. While an automatic leveling control mode is instructed by, for example, the light switch 304, this flow is repeatedly performed at a predetermined timing by the controller 104 when ignition is turned on, and this flow is ended when ignition is turned off.

First, the controller 104 determines whether the vehicle is traveling (S101). If it is determined that the vehicle is traveling (S101; Y), the controller 104 avoids adjusting the optical axis (S102) and ends this routine. If it is determined that the vehicle is not traveling (S101; N), the controller 104 determines whether there is a change in the acceleration that exceeds a threshold (S103). If it is determined that there is no change in the acceleration that exceeds the threshold (S103; N), the controller 104 ends this routine.

If it is determined that there is a change in the acceleration that exceeds the threshold (S103; Y), the controller 104 calculates the vehicle attitude angle θv using a difference in the total angle θ before and after the change in the acceleration as a difference in the vehicle attitude angle θv (S104), and updates the calculated vehicle attitude angle θv as a new reference value (S105). Further, the controller 104 adjusts the optical axis on the basis of the updated reference value of the vehicle attitude angle θv (S106), and ends this routine.

As described above, when there is the change of acceleration where the change of a vehicle orientation where the optical axis O of the lamp unit 10 is to be adjusted is estimated, the leveling ECU 100 according to this embodiment can adjust the optical axis in accordance with a difference in the total angle θ between the beginning and end of change while the vehicle is stopped and improve the accuracy of the automatic leveling control that avoids adjusting the optical axis while the vehicle is traveling.

The above-mentioned leveling ECU 100 is an aspect of the invention. The leveling ECU 100 includes the receiver 102 that receives the acceleration detected by the acceleration sensor 110, and the controller 104 that performs the above-mentioned automatic leveling control.

Examples of another aspect of the invention include a vehicle lamp system. The vehicle lamp system includes the lamp unit 10, the acceleration sensor 110, and the leveling ECU 100 (in the first implementation, the acceleration sensor 110 is included in the leveling ECU 100).

The subject matter of the present disclosure is not limited to the implementation described in detail above. Various changes and modifications can be made therein. Accordingly, other implementations are within the scope of the claims.

What is claimed is:

1. A control apparatus for a vehicle lamp, the control apparatus comprising:
a receiver to receive an acceleration signal indicative of an acceleration detected by an acceleration sensor;
a memory; and
a controller to derive an inclination angle of a vehicle relative to a horizontal plane from the acceleration signal,
wherein, while the vehicle is stopped and if a change in the acceleration exceeds a threshold, the threshold corresponding to a change in the acceleration due to a vibration of the vehicle, the controller outputs an adjustment signal indicative of an instruction to adjust an optical axis of the vehicle lamp in accordance with a difference in the inclination angle before and after the change in the acceleration,
wherein the inclination angle of the vehicle with respect to the horizontal plane includes a sum of a first angle and a second angle, the first angle being an inclination angle of a road surface relative to the horizontal plane, and the second angle being an inclination angle of the vehicle relative to the road surface,
wherein a reference value of the second angle is stored in the memory, and wherein, when the change in the acceleration exceeds the threshold while the vehicle is stopped, the controller updates the reference value of the second angle by using the difference in the inclination angle before and after the change as a difference in the second angle to change the reference value of the second angle by an angle corresponding to the difference, and generates the adjustment signal by using the updated reference value of the second angle.

2. The control apparatus according to claim 1, wherein, while the vehicle is traveling, the controller avoids outputting the adjustment signal or outputs a maintaining signal indicative of an instruction to maintain a position of the optical axis.

3. A vehicle lamp system comprising:
a vehicle lamp having an adjustable optical axis;
an acceleration sensor that detects an acceleration; and
a control apparatus, the control apparatus comprising:
 a receiver to receive an acceleration signal indicative of the acceleration detected by the acceleration sensor;
 a memory; and
 a controller to derive an inclination angle of a vehicle relative to a horizontal plane from the acceleration signal,
wherein, while the vehicle is stopped and if a change in the acceleration exceeds a threshold, the threshold corresponding to a change in the acceleration due to a vibration of the vehicle, the controller outputs an adjustment signal indicative of an instruction to adjust the optical axis of the vehicle lamp in accordance with a difference in the inclination angle before and after the change in the acceleration,
wherein the inclination angle of the vehicle with respect to the horizontal plane includes a sum of a first angle and a second angle, the first angle being an inclination angle of a road surface relative to the horizontal plane, and the second angle being an inclination angle of the vehicle relative to the road surface, wherein a reference value of the second angle is stored in the memory, and
wherein, when the change in the acceleration exceeds a threshold while the vehicle is stopped, the controller updates the reference value of the second angle by using the difference in the inclination angle before and after the change as a difference in the second angle to change the reference value of the second angle by an angle corresponding to the difference, and generates the adjustment signal by using the updated reference value of the second angle.

4. The vehicle lamp system according to claim 3, wherein, while the vehicle is traveling, the controller avoids outputting the adjustment signal or outputs a maintaining signal indicative of an instruction to maintain a position of the optical axis.

* * * * *